US012787093B2

(12) United States Patent
Mattam et al.

(10) Patent No.: US 12,787,093 B2
(45) Date of Patent: Nov. 3, 2026

(54) SYSTEM AND METHOD FOR PRIORITIZING A SECONDARY CELL GROUP SUPPORTED CELL IN DUAL CONNECTIVITY

(71) Applicant: Samsung Electronics Co., Ltd., Suwon-si (KR)

(72) Inventors: Jajohn Mathew Mattam, Bangalore (IN); Manasi Ekkundi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 18/748,944

(22) Filed: Jun. 20, 2024

(65) Prior Publication Data

US 2025/0106921 A1 Mar. 27, 2025

Related U.S. Application Data

(63) Continuation of application No. PCT/KR2024/008416, filed on Jun. 18, 2024.

(30) Foreign Application Priority Data

Sep. 21, 2023 (IN) ............................. 202341063513

(51) Int. Cl.
*H04W 4/00* (2018.01)
*H04W 36/00* (2009.01)
(Continued)

(52) U.S. Cl.
CPC ....... *H04W 76/15* (2018.02); *H04W 36/0069* (2018.08); *H04W 72/56* (2023.01)

(58) Field of Classification Search
CPC . H04W 76/15; H04W 36/0069; H04W 72/56; H04W 76/34; H04W 88/02;
(Continued)

(56) References Cited

U.S. PATENT DOCUMENTS 8,589,911 B1 11/2013 Sharkey et al.
10,332,518 B2 6/2019 Garg et al.
(Continued)

FOREIGN PATENT DOCUMENTS

WO 2018/174791 A1 9/2018
WO 2023/286422 A1 1/2023
WO 2023/130274 A1 7/2023

OTHER PUBLICATIONS

International Search Report with Written Opinion dated Sep. 13, 2024; International Appln. No. PCT/KR2024/008416.
(Continued)

*Primary Examiner* — Omoniyi Obayanju
(74) *Attorney, Agent, or Firm* — Jefferson IP Law, LLP

(57) ABSTRACT

A method, performed by a user equipment (UE), for prioritizing a secondary cell group (SCG) supported cell in dual connectivity is provided. The method includes detecting whether the SCG supported cell is called for with respect to a service that is triggered at the UE and detecting that a connection of the UE with the SCG supported cell is released in a case. Further, the method includes detecting whether the service that is triggered at the UE has ended and detecting, based on network configured SCG measurements, the SCG supported cell by using one or more unused new radio (NR) antennas of the UE. The method also includes identifying a master cell group supporting the detected SCG supported cell and switching from a master cell not supporting SCG to the identified master cell group supporting the detected SCG supported cell.

20 Claims, 9 Drawing Sheets

(51) Int. Cl.
*H04W 72/56* (2023.01)
*H04W 76/15* (2018.01)

(58) Field of Classification Search
CPC ..... H04W 36/00698; H04W 36/00835; H04W 36/008355; H04W 76/16
See application file for complete search history.

(56) References Cited

U.S. PATENT DOCUMENTS

| | | | |
|---|---|---|---|
| 2013/0237218 | A1 | 9/2013 | Li et al. |
| 2014/0335882 | A1 | 11/2014 | Lee et al. |
| 2015/0264621 | A1 | 9/2015 | Sivanesan et al. |
| 2019/0387569 | A1 | 12/2019 | Martinez Tarradell et al. |
| 2020/0137819 | A1 | 4/2020 | Shi et al. |
| 2020/0351968 | A1* | 11/2020 | Yilmaz ................. H04W 76/27 |
| 2021/0044993 | A1 | 2/2021 | Jha et al. |
| 2021/0251029 | A1* | 8/2021 | Sanders ................ H04W 40/36 |
| 2021/0298106 | A1 | 9/2021 | Jha et al. |
| 2021/0360559 | A1 | 11/2021 | Agiwal et al. |
| 2023/0048183 | A1 | 2/2023 | Xu et al. |
| 2024/0388965 | A1 | 11/2024 | Futaki et al. |

OTHER PUBLICATIONS

Extended European search report dated May 6, 2026; European Appln. 24868419-1206.

* cited by examiner

SYSTEM AND METHOD FOR PRIORITIZING A SECONDARY CELL GROUP SUPPORTED CELL IN DUAL CONNECTIVITY

CROSS-REFERENCE TO RELATED APPLICATION(S)

This application is a continuation application, claiming priority under § 365(c), of an International application No. PCT/KR2024/008416, filed on Jun. 18, 2024, which is based on and claims the benefit of an Indian patent application number 202341063513, filed on Sep. 21, 2023, in the Indian Intellectual Property Office, the disclosure of which is incorporated by reference herein in its entirety.

TECHNICAL FIELD

The disclosure relates to the field of wireless communication systems. More particularly, the disclosure relates to a system and method for prioritizing a secondary cell group (SCG) supported cell in dual connectivity.

BACKGROUND

In recent years, dual connectivity in a user equipment (UE) has emerged as a technological solution to enhance the performance and capacity of wireless communication networks. The dual connectivity refers to the capability of a mobile device, such as a smartphone or tablet, to simultaneously establish and maintain simultaneous connections with two different base stations or cells within a cellular network. The dual connectivity feature is typically associated with fifth generation (5G) networks, i.e., new radio (NR), and is used to enhance data rates, improve reliability, and optimize resource utilization. For example, NR dual connectivity (NRDC) is a dual connectivity scenario that enables the UE to simultaneously connect to two different base stations, one operating in the 5G NR and the other in a fourth generation (4G) long-term evolution (LTE) technology. If the UE supports dual connectivity, hardware/radio-wave associated with the UE has antennas for frequency range (FR) 1 and FR2 bands. Further, there are multiple types of dual connectivity (DC) scenarios deployed or under consideration for commercialization, such as LTE-FR1 evolved universal terrestrial radio access network (E-UTRAN) New Radio—dual connectivity (ENDC), i.e., LTE is the master cell group (MCG) and NR (FR1/sub6) may be the secondary cell group (SCG), LTE-FR2 (ENDC), i.e., LTE may be the MCG and NR (FR2/millimeter-wave (mmW)) may be the SCG, FR1-FR2 (NRDC), i.e., NR (FR1) may be the MCG and NR (FR2/mmw) may be the SCG, and the like.

However, there are several issues that may be faced by the UE while accessing a service in a dual connectivity architecture, which may affect the quality of service (QOS). For example, in a scenario where FR1 and FR2, or LTE and FR1/FR2 are configured by the cellular network. This scenario is used when a specific service that calls for a high data rate is running on the UE. Furthermore, if any other service, such as voice/video call is triggered, the SCG is dropped based on network support. Also, there are multiple possibilities associated with the network support based on which it is determined whether the SCG is to be dropped or not, for example, a network configuration including voice over new radio (VoNR)+SCG, a network configuration including VoNR+No SCG, a network configuration including LTE+SCG, a network configuration including LTE+No SCG, and the like. In a case in which the SCG is dropped due to any service and the service is over, it is not necessary that the UE would be in the same cell or radio access technology (RAT) where SCG may be added (due to mobility or any other deployment cases). In particular, the QoS to the user is affected if the service that calls for a high data rate is still running on the UE. In general, if the service which resulted in the SCG drop has ended, the UE may wait for the network to configure the SCG measurements. Once the SCG measurements are configured, the UE may start measuring the cells and send the measurement report to the network and the SCG may be added. However, even if the UE is in a cell that supports the SCG, there may be a delay in performing measurements and adding FR2. Therefore, even if the dual connectivity is supported by the UE, the best QoS cannot be guaranteed to the user due to the non-addition of the SCG.

FIGS. 1A and 1B illustrate flow diagrams depicting existing problem scenarios associated with the UE while accessing a service in a dual connectivity scenario, according to the related art. FIG. 1A depicts a scenario 100A in which the UE is facing an issue while connecting with the mmW cell. However, FIG. 1A may also be used for sub-6 case. At operation 102A, the UE fails to add an mmW cell for accessing the service due to one or more reasons, such as no mmW support, service trigger resulting in mmW drop, and UE moving to a cell with no mmW support, and the like. Further, at operation 104A, the UE is in the cell where there is no mmW. Furthermore, the UE is required to wait for the network to configure mmW measurements.

Further, another scenario 100B is depicted in FIG. 1B in which the UE is facing an issue while connecting with the mmW cell. As may be seen from FIG. 1B, at operation 102B, the mmW cell is blocked due to the service. At operation 104B, the UE determines that the service which blocked the mmW cell has ended. Further, it is determined if the network has configured mmW measurements. If the network has configured the mmW measurements, operations 106B and 108B are performed, else operations 110B and 112B are performed. At operation 106B, the UE starts measuring mmW cells. Further, at operation 108B, the mmW cells are added. Furthermore, at operation 110B, no mmW cells are measured. At operation 112B, the mmW cells may not be added.

Therefore, there is a need for a solution that may overcome the above-discussed problems associated with dual connectivity and may help in prioritizing a SCG-supported cell in the dual connectivity architecture.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and method for prioritizing a secondary cell group (SCG) supported cell in dual connectivity.

Additional aspects will be set forth in part in the description which follows and, in part, will be apparent from the description, or may be learned by practice of the presented embodiments.

In accordance with an aspect of the disclosure, a method, performed by a user equipment (UE), for prioritizing a secondary cell group (SCG) supported cell in dual connectivity is provided. The method includes detecting whether the SCG supported cell is called for with respect to a service that is triggered at the UE. Further, the method includes detecting that a UE connection with the SCG supported cell is released in a case in which it is detected that the SCG supported cell is not called for with respect to the service that is triggered at the UE. Further, the method includes detecting whether the service that is triggered at the UE has ended. Furthermore, the method includes detecting, based on network configured SCG measurements, the SCG supported cell by using one or more unused new radio (NR) antennas of the UE, based on detecting that the service that is triggered at the UE has ended. The method also includes identifying a master cell group supporting the detected SCG supported cell. Further, the method includes switching from a master cell not supporting SCG to the identified master cell group supporting the detected SCG supported cell.

In accordance with another aspect of the disclosure, a UE for prioritizing a SCG supported cell in dual connectivity is provided. The UE includes memory and one or more processors communicatively coupled to the memory. The one or more processors are configured to detect whether the SCG supported cell is called for with respect to a service that is triggered at the UE. The one or more processors are further configured to detect that a UE connection with the SCG supported cell is released in a case in which it is detected that the SCG supported cell is not called for with respect to the service that is triggered at the UE. The one or more processors are further configured to detect whether the service that is triggered at the UE has ended. Additionally, the one or more processors are configured to detect, based on network configured SCG measurements, the SCG supported cell by using one or more unused NR antennas of the UE, based on detecting that the service that is triggered at the UE has ended. The one or more processors are configured to identify a master cell group supporting the detected SCG supported cell. Further, the one or more processors are configured to switch from a master cell not supporting SCG to the identified master cell group supporting the detected SCG supported cell.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
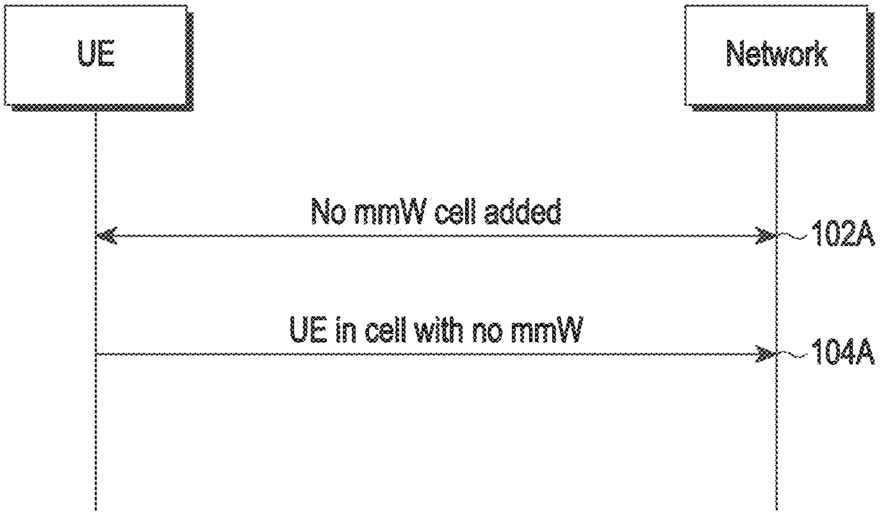
FIG. 1A (RELATED ART)
FIGS. 1A and 1B illustrate flow diagrams depicting an existing problem scenario associated with a user equipment (UE) while accessing a service in dual connectivity scenario, according to the related art.
Figure 1B:
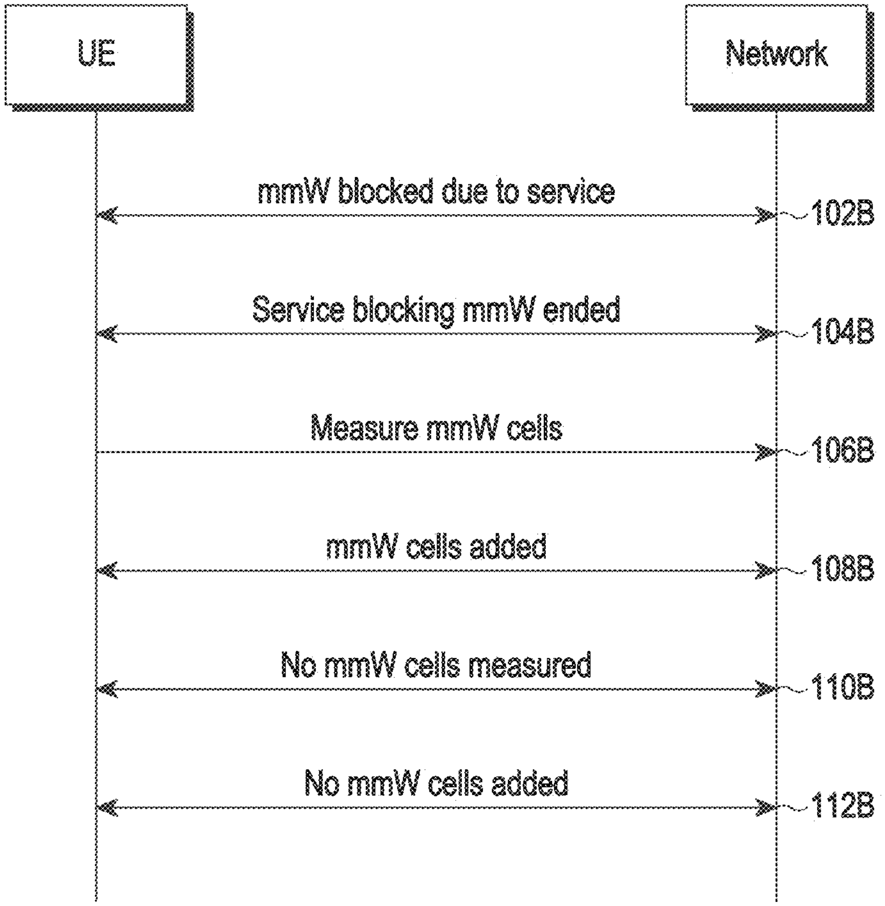
FIG. 1B (RELATED ART)

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

The term “some” as used herein is defined as “none, or one, or more than one, or all.” Accordingly, the terms “none,” “one,” “more than one,” “more than one, but not all” or “all” would all fall under the definition of “some.” The term “some embodiments” may refer to one embodiment, to several embodiments or to all embodiments. Accordingly, the term “some embodiments” is defined as meaning “no embodiment, or one embodiment, or more than one embodiment, or all embodiments.”

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to “includes,” “comprises,” “has,” “have,” and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "need to include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element does not preclude there being none of that feature or element, unless otherwise specified by limiting language such as "there needs to be one or more" or "one or more element is required."

Unless otherwise defined, all terms, and especially any technical and/or scientific terms, used herein may be taken to have the same meaning as commonly understood by one having ordinary skill in the art.

Embodiments of the disclosure will be described below in detail with reference to the accompanying drawings.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any such of the one or more computer programs may be stored in one or more non-transitory computer-readable storage media, such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of one or more non-transitory computer-readable storage media storing one or more computer programs including computer-executable instructions that, when executed by one or more processors of an electronic device, cause the electronic device to perform any combination of the operations described or claimed herein.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 2:
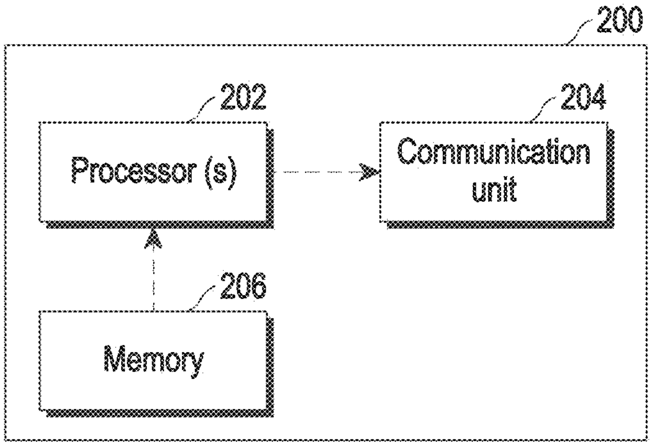
FIG. 2 illustrates an example block diagram of the UE, according to an embodiment of the disclosure.

FIG. 2 illustrates an example block diagram of a user equipment (UE) 200, according to an embodiment of the disclosure. The example block diagram of the UE 200 as shown in FIG. 2 may be understood as a part of the configuration of the UE 200. Hereinafter, it is understood that terms including "unit" or "module" as illustrated in the drawings may refer to the unit for processing at least one function or operation and may be implemented in a hardware, software, or a combination of hardware and software.

Referring to FIG. 2, the UE 200 may include one or more processors 202, a communication unit 204 (e.g., a communicator or a communication interface), and memory 206. By way of example, the UE 200 may be an electronic device, such as a cellular phone, a mobile phone, a smartphone, a tablet, a computing device, personal digital assistance (PDA), or other devices that may communicate over cellular networks (such as a third generation (3G), fourth generation (4G), fifth generation (5G), and beyond 5G networks or any future wireless communication network). The communication unit 204 may perform functions for transmitting and receiving signals via a wireless channel.

As an example, the one or more processors 202 may be a single processing unit or a number of units, all of which could include multiple computing units. The one or more processors 202 may be implemented as one or more microprocessors, microcomputers, microcontrollers, digital signal processors, central processing units, state machines, logic circuitries, and/or any devices that manipulate signals based on operational instructions. Among other capabilities, the one or more processors 202 are configured to fetch and execute computer-readable instructions and data stored in the memory 206. The one or more processors 202 may include one or a plurality of processors. At this time, one or a plurality of processors may be a general-purpose processor, such as a CPU, an AP, or the like, a graphics-only processing unit such as a GPU, a Visual Processing Unit (VPU), and/or an AI-dedicated processor such as a NPU. The one or a plurality of processors may control the processing of the input data in accordance with a specified operating rule or AI model stored in the non-volatile memory and the volatile memory. The specified operating rule or artificial intelligence model is provided through training or learning.

The memory 206 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

Some example embodiments disclosed herein may be implemented using processing circuitry. For example, some example embodiments disclosed herein may be implemented using at least one software program running on at least one hardware device and performing network management functions to control the elements.

In an embodiment of the disclosure, the one or more processors 202 of the UE 200 are configured for prioritizing a secondary cell group (SCG) supported cell in the dual connectivity. In an embodiment of the disclosure, the SCG supported cell, also known as the secondary cell, is one of the cells to which the UE 200 may simultaneously connect in a dual connectivity setup. The one or more processors 202 are configured to detect whether the SCG supported cell is called for with respect to a service that is triggered at the UE 200. In an embodiment of the disclosure, the service may be voice call, messaging, mobile data, video calls, and the like. In an embodiment of the disclosure, the SCG supported cell supports one or more operating frequencies in a frequency range-1 (FR-1) or a frequency range-2 (FR-2). In the context of the dual connectivity in the 5G new radio (NR) networks, "FR 1" and "FR 2" refer to different frequency ranges where the UE 200 may establish connections with base stations. FR 1, also known as Sub-6 gigahertz (GHz) frequency range, includes frequency bands below 6 GHz. Further, FR 2, also known as millimeter wave (mmW) frequency range, includes frequency bands above 24 GHZ, reaching up to 52.6 GHz in the current 5G specifications. The use of the dual connectivity with both FR 1 and FR 2 allows network operators to provide a combination of wide-area coverage (using FR 1) and high-capacity, ultra-fast data rates (using FR 2) to meet the diverse needs of users in different areas and scenarios.

Further, the one or more processors 202 detect that the SCG supported cell is no longer called for with respect to the service that is triggered at the UE 200. Furthermore, the one or more processors 202 are configured to detect that a connection of the UE 200 with the SCG supported cell is released by the network in a case in which it is detected that the SCG supported cell is not called for with respect to the service that is triggered at the UE 200. In an embodiment of the disclosure, the service for which the SCG supported cell is not called for may be voice over long-term evolution (VoLTE), video over long-term evolution (ViLTE), voice over NR (VoNR), video over NR (ViNR), or the like.

Furthermore, the one or more processors 202 are configured to detect whether the service that is triggered at the UE 200 has ended.

Further, the one or more processors 202 are configured to detect, based on network configured SCG measurements, the SCG supported cell by using unused new radio (NR) antennas of the UE 200, upon detecting that the service that is triggered at the UE 200 has ended. In an embodiment of the disclosure, the SCG measurements refer to specific measurements performed by the UE 200 to assess the performance and quality of the SCG cell in which it is connected. For example, the SCG measurements may include at least one of signal strength, signal quality, channel quality indicators (CQI), reference signal received power (RSRP), received signal strength indicator (RSSI), load balancing metrics, latency, throughput, or the like. In an embodiment of the disclosure, the cell measurement for detecting the SCG supported cell is performed before one or more FR1/LTE measurements. Further, the one or more processors 202 are configured to sync the cell measurement associated with the SCG supported cell along with one or more FR1/LTE measurements during measurement gaps.

In detecting the SCG supported cell, the one or more processors 202 are configured to detect whether a new service is triggered at the UE 200 upon detecting that the service that is triggered at the UE 200 has ended. Further, the one or more processors 202 are configured to determine whether the new service that is triggered at the UE 200 calls for a higher data rate upon detecting that the new service is triggered at the UE 200. In an embodiment of the disclosure, the higher data rate refers to the ability of the UE to transmit and receive data at faster speeds. For example, if the SCG is dropped due to any other service, and the same service has ended, the UE 200 determines if the high data rate is still called for with respect to any service. The disclosure may also be applied even when there is a need for a high data rate and need not be when there is a drop of SCG due to any service.

The one or more processors 202 are further configured to determine whether a network configured the SCG measurements upon determining that the new service triggered at the UE 200 calls for the higher data rate. Furthermore, upon determining that the network configured the SCG measurements, the one or more processors 202 are configured to detect the SCG supported cell using the one or more unused NR antennas of the UE 200. In an embodiment of the disclosure, the one or more unused NR antennas of the UE 200 refer to additional antennas in the 5G NR capable device that are not currently being used for transmitting or receiving data. The one or more unused antennas are part of the multiple-input, multiple-output (MIMO) antennas used in 5G communication networks. For example, hardware configuration of the UE 200 includes separate antennas for long-term evolution (LTE)/FR1 and FR2. There are possibilities that some of FR1 band antennas may be used by LTE also. However, FR2 band antennas may not be used when the SCG is not used and the FR2 band antennas may not be available when not in use. Therefore, the UE 200 uses these NR antennas which are not being used to perform the measurements at regular intervals. Even if FR1 and LTE bands are grouped under the same antenna, the measurements may be performed in the measurement gaps which the network configured for the LTE. The measurements results may be used for faster SCG addition or to change the anchor cell which supports the SCG.

Further, if the network does not configure the SCG measurements for a specified duration, the one or more processors 202 are configured to determine whether a current serving cell of the UE 200 is stored in a cell database (DB). Furthermore, upon determining that the current serving cell of the UE 200 is stored in the cell database, the one or more processors 202 are configured to determine if the current serving cell corresponds to a highest priority radio access technology (RAT).

Furthermore, upon determining that the current serving cell is not stored in the cell database or the current serving cell does not correspond to the highest priority RAT, the one or more processors 202 are configured to detect one or more neighboring cells associated with the current serving cell. The one or more processors 202 are further configured to determine whether the measurements associated with the one or more neighboring cells are above a specified threshold using the cell database. Further, in a case, if it is determined that the measurements associated with the one or more neighboring cells are above the specified threshold, the one or more processors 202 are configured to detect, using the one or more unused NR antennas (mmW antennas), one or more SCG supported cells at a current UE 200 location from amongst the detected one or more neighboring cells. In an embodiment of the disclosure, the one or more SCG supported cells may be associated with the detected one or more neighboring cells.

Further, the one or more processors 202 are configured to transmit a measurement report associated with the one or more SCG supported cells to a network. The measurement report is transmitted by the UE 200 to the network to get the handover to a corresponding cell. In an embodiment of the disclosure, the measurement report associated with the SCG supported cells is a report provided by the UE 200 to the network about the radio conditions and performance of the secondary cells in the SCG. The one or more processors 202 are configured to detect if a handover (HO) message is received from the network within a specified time duration in response to the transmission of the measurement report. If the network sends HO messages to a neighbor cell, the UE 200 waits for the network to configure measurements for SCG cells. Further, the one or more processors 202 are configured to release a current connection of the UE 200 locally, and perform cell selection upon detecting that the HO message is not received from the network within the specified time duration. The one or more processors 202 are configured to perform a cell reselection process to select the SCG supported cell that has better network parameters among the detected one or more SCG supported cells in comparison to other SCG supported cells among the detected one or more SCG supported cells. In an embodiment of the disclosure, the connection is released if the UE 200 may find the cells supporting SCG which are above a configurable measurement threshold. Further, the cell selection is performed to the SCG supported cell that has better network parameters.

In an embodiment of the disclosure, when the device is in a connected mode, NR antennas may be used to measure cells (to avoid battery drain). The measurements are triggered based on a particular UE's implementation. For example, in the first scenario, the UE 200 may try to complete the measurements of all FR2 cells before ‘a’ number of FR1/LTE measurements (measurement gaps). In the second scenario, 1 or 2 rounds of measurements, the UE 200 may suspend the measurements for ‘b’ duration. If the device is not able to detect any FR2 cells, the UE 200 may keep increasing the ‘b’ duration. FR1 measurements may be performed during the measurement gaps.

Further, the one or more processors 202 are configured to identify a master cell group supporting the detected SCG supported cell. The master cell group refers to the primary cell group that includes the primary 5G NR cell to which the UE 200 is primarily connected. The master cell group handles most of the control signaling and data transfer related to the services. In an embodiment of the disclosure, each cell in the master cell group supports FR-1 or LTE.

Furthermore, the one or more processors 202 are configured to switch from a master cell not supporting SCG to the identified master cell group supporting the detected SCG supported cell.

In an embodiment of the disclosure, the one or more processors 202 are configured to store information associated with one or more primary cells and one or more cell parameters associated with one or more SCG supported cells in the cell database. In an embodiment of the disclosure, the cell database stores the Pcell details which may add SCG based on history associated with the SCG. The one or more primary cells are part of the master cell group which handles most of the control signaling and data transfer related to the services. In an embodiment of the disclosure, the one or more cell parameters includes a physical cell identifier (PCI), a frequency band, a measurement threshold, and other measurement related configurations. The size of the cell database may be limited and the cell database may keep over-writing the old entries in order to accommodate new entries. In an embodiment of the disclosure, the size of the cell database is implementation specific.

In operation, the UE 200 releases the connection with a SCG supported cell (FR2) if a service that does not call for the SCG supported cell is initiated. Further, the UE 200 detects the SCG supported cell (FR2) using mmW antennas of the UE 200, if a service that does not call for the SCG supported cell has ended. Furthermore, the UE 200 identifies a master cell group (FR1) supporting the detected SCG supported cell (FR2). The UE 200 switches from a master cell not supporting SCG to the master cell group (FR1) supporting the SCG supported cell (FR2). In an embodiment of the disclosure, the UE 200 utilizes NR antennas to detect the presence of NR cells at a location when there are no NR measurements configured by the network. The UE 200 identifies the cells that support the detected NR cells as SCG. In an embodiment of the disclosure, UE 200 switches from a master cell not supporting SCG to the master cell group that supports the detected NR cells.

Figure 3A:
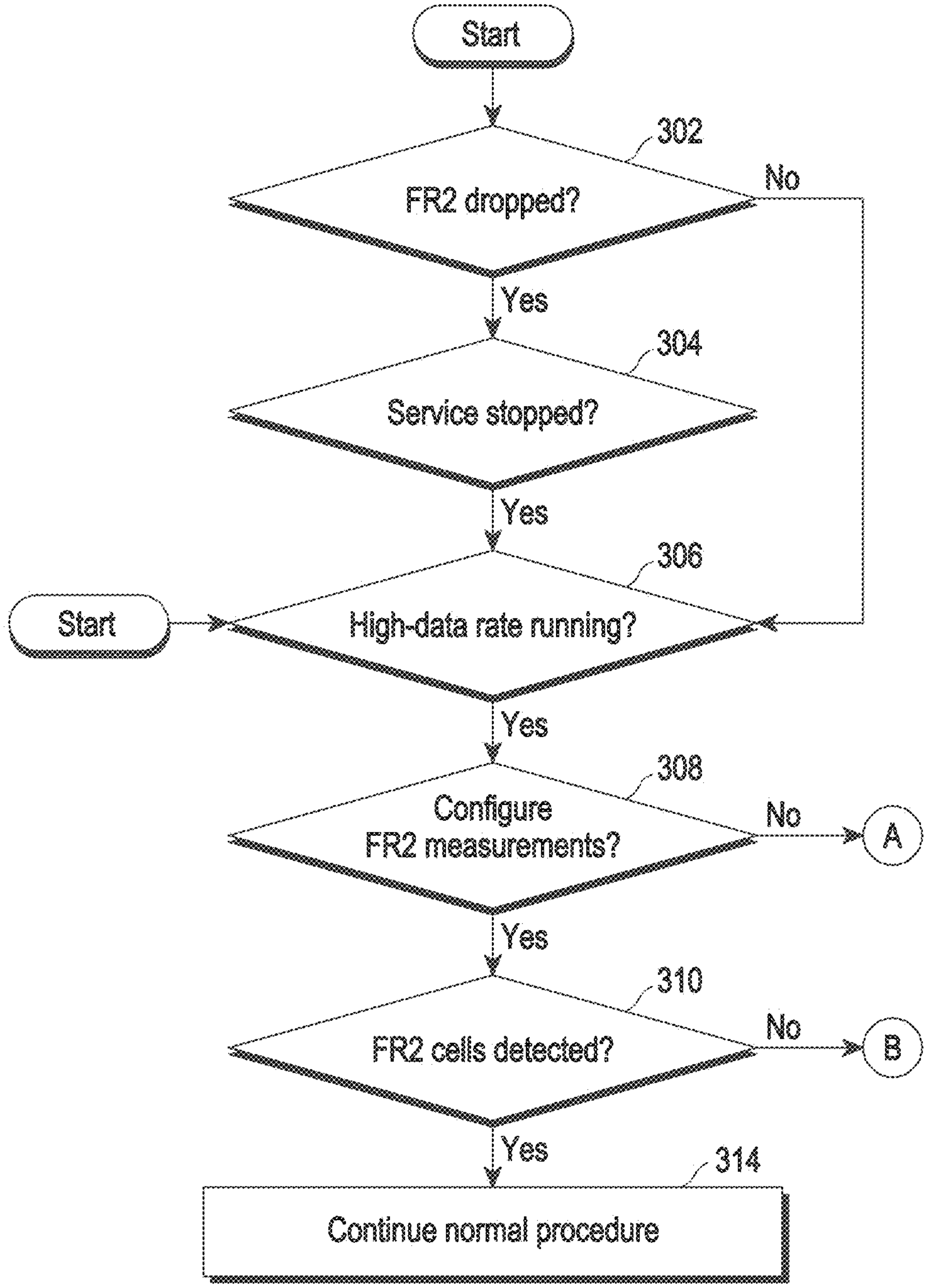
FIGS. 3A, 3B, and 3C illustrate flow diagrams depicting operations performed by the UE for prioritizing a secondary cell group (SCG) supported cell in the dual connectivity, according to various embodiments of the disclosure.
Figure 3B:
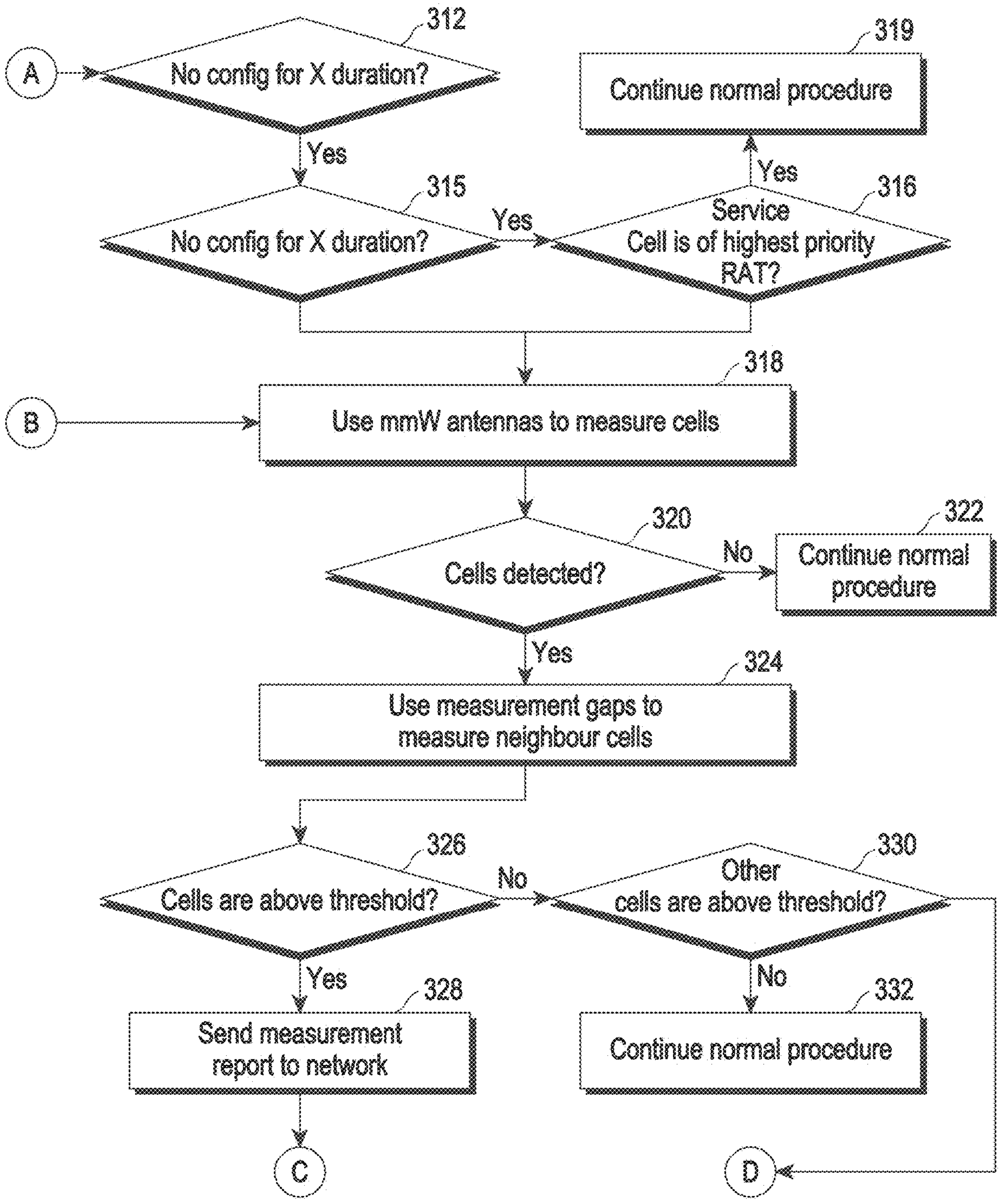
Figure 3C:
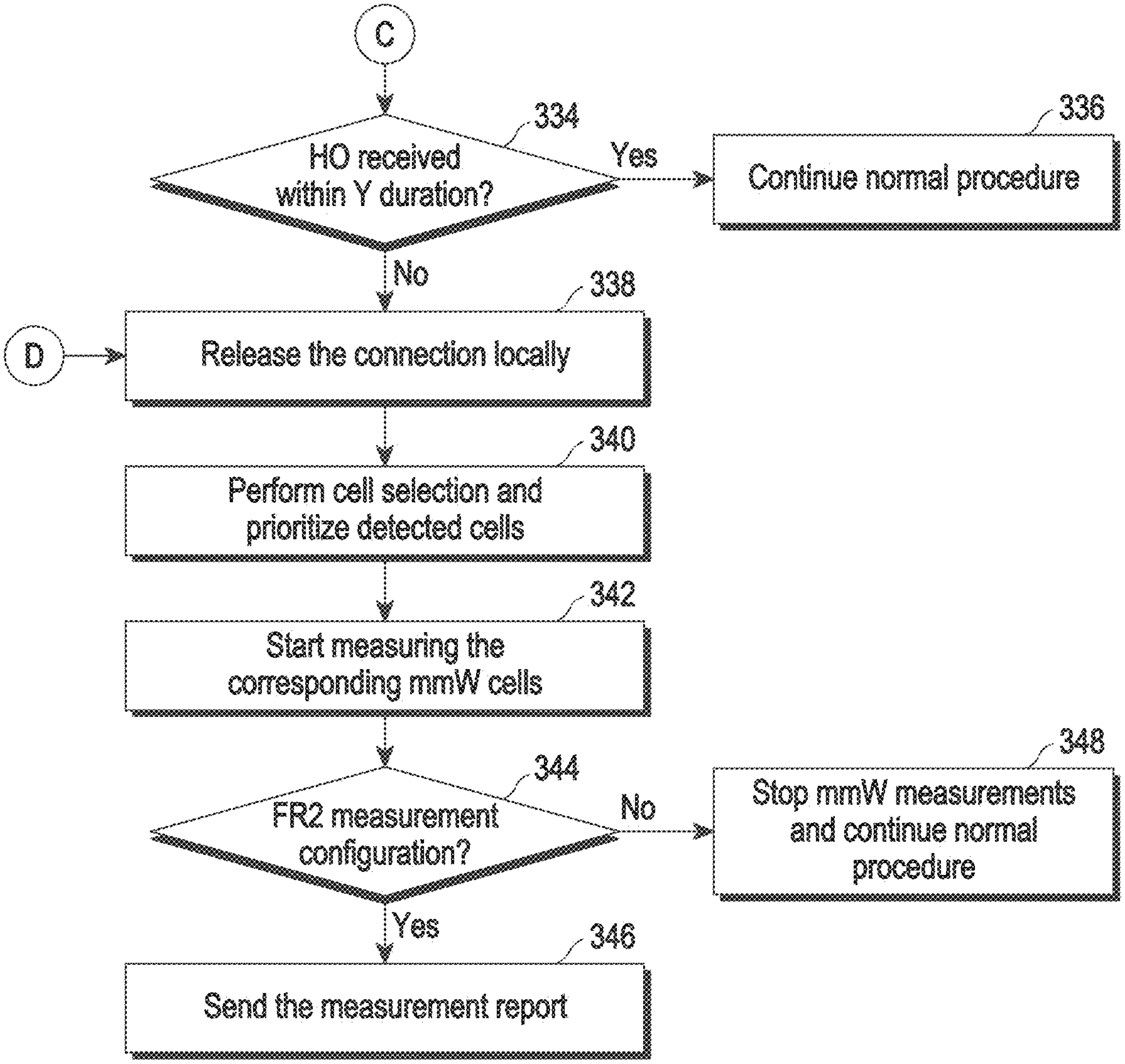

FIGS. 3A, 3B, and 3C illustrate flow diagrams depicting operations performed by the UE for prioritizing the SCG supported cell in the dual connectivity, according to various embodiments of the disclosure.

In an embodiment of the disclosure, the operations depicted in FIGS. 3A to 3C are illustrated corresponding to an FR2 cell. However, the operations may also be applied to an FR1 cell. At operation 302, the UE 200 determines if the FR2 cell is dropped due to any service running on the UE 200. If the result of the determination at operation 302 is yes, the UE 200, at operation 304, determines whether the service is dropped. If a result of the determination at operation is yes, the UE 200, at operation 306, determines whether a service that calls for the high data rate is running on the UE 200. Further, if the result of the determination at operation 306 is yes, the UE 200, at operation 308, determines if the network configured FR2 measurements. Thereafter, if the result of the determination at operation 308 is yes, the UE 200, at operation 310, determines if the UE 200 detected the FR2 cells. However, in a case in which the result of the determination at operation 308 is no, the UE 200 performs the operation of operation 312. Furthermore, if the result of the determination at operation 310 is yes, the UE 200 performs a normal procedure that is continued at operation 314. In an embodiment of the disclosure, the normal procedure corresponds to existing third generation partnership project (3GPP). Furthermore, if the result of the determination at the operation 310 is no, the UE 200 performs the operation of operation 318. The operation performed by the UE 200 at the operation 310 is described in detail in the forthcoming paragraphs.

At operation 312, the UE 200 determines if there is a configuration for a specified duration (X). In an embodiment of the disclosure, the specified duration (X) is measured by a timer that is implementation specific. If, at operation 312, there is no configuration for the specified duration, at operation 315, the UE 200 determines if the serving cell is present in the cell database. If there is a configuration for the specified duration at operation 315, the UE 200 determines if the serving cell belongs to a highest priority RAT, at operation 316. If the result of operations 314 and 316 is no, operation 318 is performed. Else, at operation 319, the normal procedure is continued. At operation 318, the UE 200 uses mmW antennas to measure the cells belonging to the neighboring cell and the highest priority RAT list from the cell database. In an embodiment of the disclosure, the UE 200 skips one or more cells which are already measured by the UE 200. At operation 320, it is determined if the cells are detected. If the output of operation 320 is no, the normal procedure is continued at operation 322. If the output of operation 320 is yes, the UE 200 uses measurement gaps to measure the neighboring cells and the highest priority RAT cells in the cell database at operation 324.

Further, at operation 326, it is determined if the cells from the configured neighbor list are detected, and the detected cells are above a configurable threshold. If yes, the UE 200 sends the measurement to the network to receive the HO to the neighboring cell at operation 328. Further, if the output of operation 326 is not, it is determined if other cells are detected, and the detected other cells are above a configurable threshold at operation 330. If no, at operation 332, the normal procedure is continued.

Furthermore, at operation 334, it is determined if the HO is received within a Y duration. If yes, at operation 336, the normal procedure is continued. If the output of operation 334 is no, the connection is released locally at operation 338. At operation 340, the UE 200 performs cell selection and prioritizes the detected cells based on high-priority RAT and the threshold time. In an embodiment of the disclosure, the time taken for cell selection is less as all the measurements and cell details are already available. When the UE 200 camps to the cell and moves to a connected mode at operation 342, the UE 200 starts measuring corresponding mmW cells with respect to serving cells to perform faster mmW addition. Further, at operation 344, the UE 200 determines if there is FR2 measurement configuration within a Z duration. If yes, the UE 200 sends the measurement report, gets the SCG added, and updates the cell database if appropriate at operation 346. Further, at operation 348, stop mmW measurements and continue the normal procedure.

Figure 4:
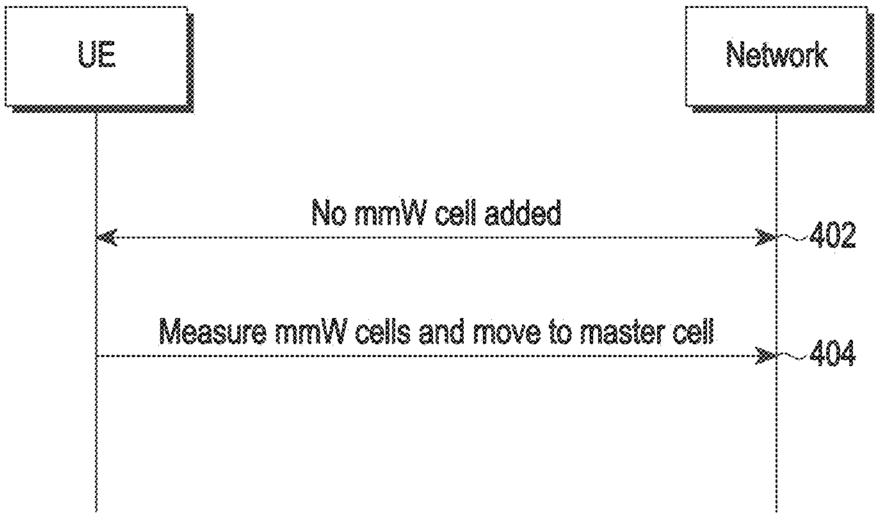
FIG. 4 illustrates a flow diagram depicting operations performed by the UE for switching to a master cell group, according to an embodiment of the disclosure.

FIG. 4 illustrates a flow diagram depicting operations performed by the UE 200 for switching to a master cell group, according to an embodiment of the disclosure.

FIG. 4 depicts a scenario where the UE 200 is connected with the mmW cell. However, FIG. 4 may also be used for sub-6 case. At operation 402, the UE 200 fails to add mmW cell for accessing the service due to one or more reasons, such as no mmW support, service trigger resulted in mmW drop, and the UE 200 moves to cell with no mmW support, and the like. Further, at operation 404, the UE 200 measures mmW cells based on previous configurations. If the mmW cells are detected, the UE 200 moves to the master cell supporting the corresponding mmW cell.

In an embodiment of the disclosure, when the UE 200 is in a master cell which does not support SCG and if the ongoing service calls for the higher data rate, the UE 200 may start using the NR antennas to detect the presence of cells in the area based on the cell details stored. If the UE 200 is able to detect any NR cell, the UE 200 may initiate the procedure to switch from a master cell not supporting SCG to the master cell which supports the detected NR cell and attempts to get the SCG added.

Figure 5:
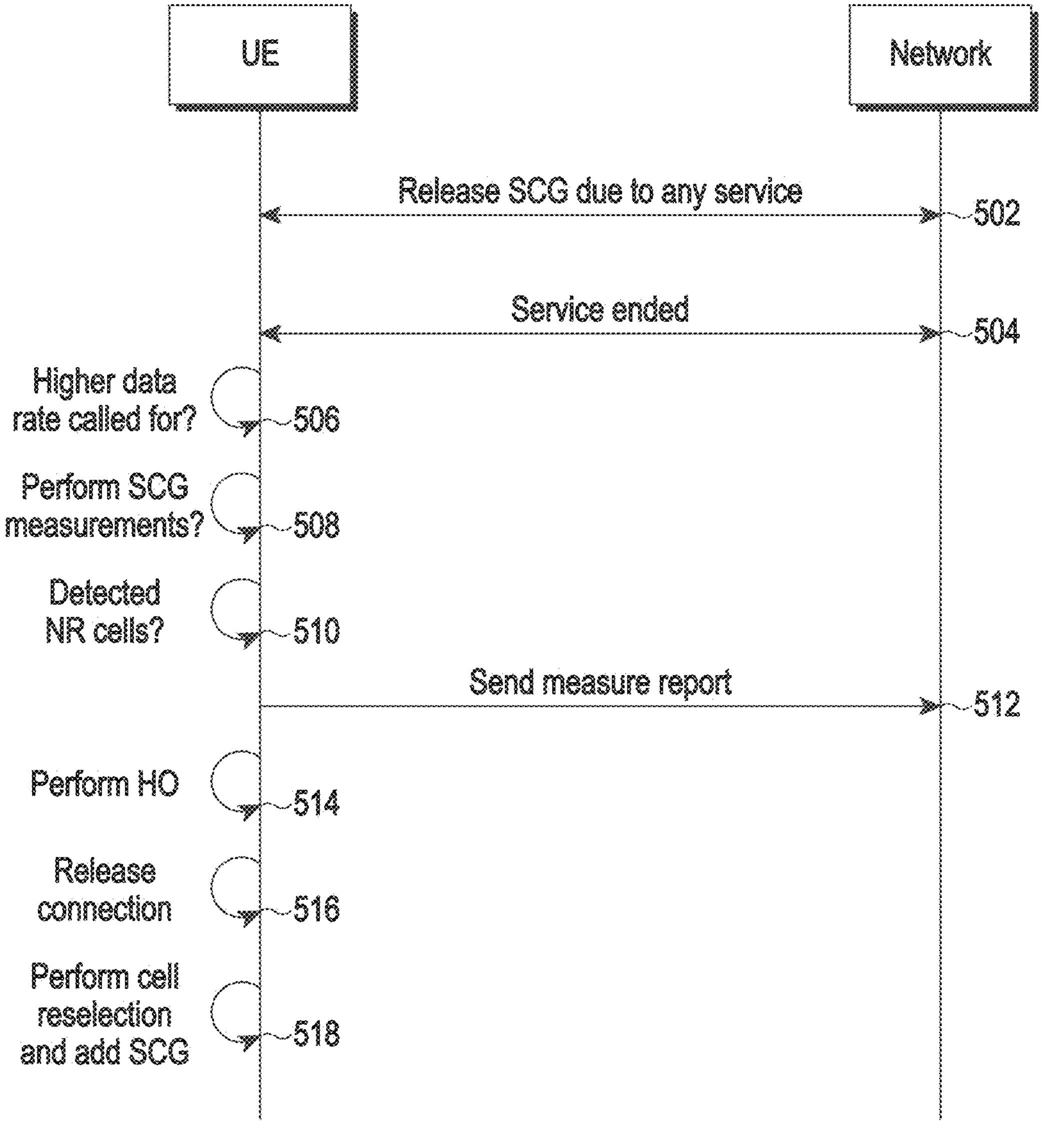
FIG. 5 illustrates a flow diagram depicting operations performed by the UE for prioritizing the SCG supported cell in the dual connectivity, according to an embodiment of the disclosure.

FIG. 5 illustrates a flow diagram depicting operations performed by the UE 200 for prioritizing the SCG supported cell in the dual connectivity, according to an embodiment of the disclosure.

At operation 502, the UE 200 releases SCG due to a service running in the UE 200. At operation 504, the UE 200 determines that the service ended. Further, at operation 506, the UE 200 determines if high data rate is called for and if the network performed SCG measurements. If yes, at operation 508, the UE 200 starts performing the SCG measurements based on stored data. At operation 510, it is determined if the NR cells are detected. At operation 512, the UE 200 sends the measurement report to the network for changing the primary cell to aid the SCG addition.

At operation 514, the UE 200 performs the HO and gets the SCG added when the HO command is received. Further, at operation 516, the UE 200 releases the connection locally if no HO command is received for a configurable duration. At operation 518, the UE 200 performs cell selection and prioritizes the cell that supports SCG. Further, the UE 200 gets the SCG added.

Figure 6:
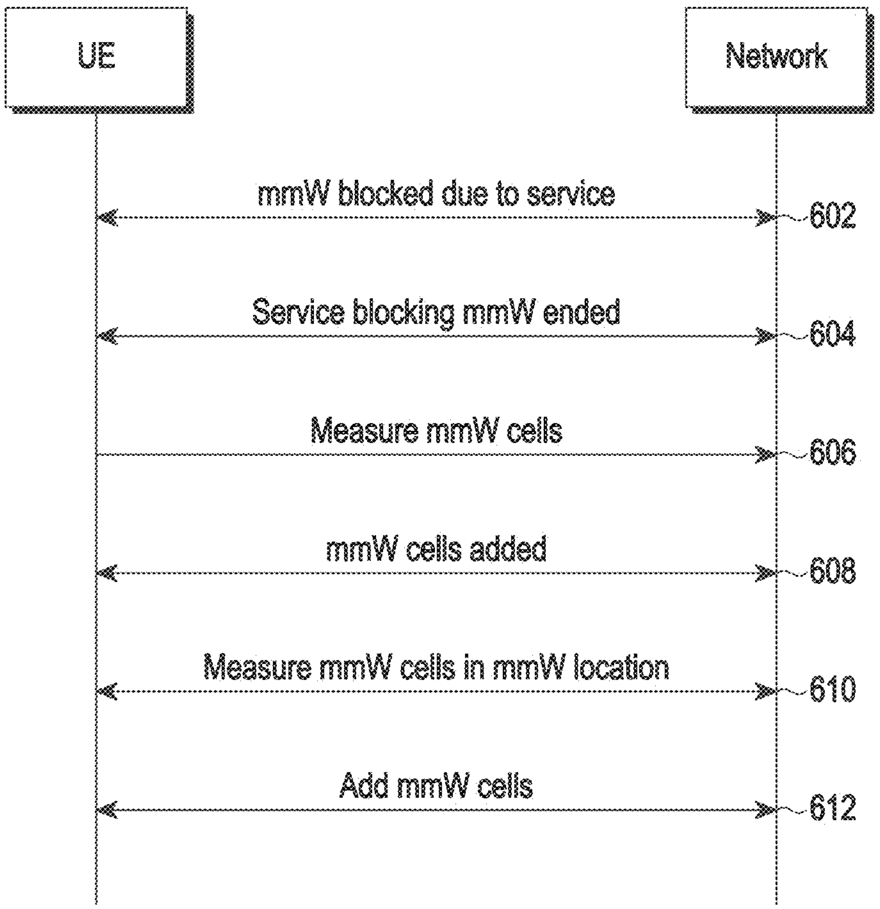
FIG. 6 illustrates a flow diagram depicting operations performed by the UE for prioritizing the SCG supported cell in the dual connectivity, according to an embodiment of the disclosure.

FIG. 6 illustrates a flow diagram depicting operations performed by the UE 200 for prioritizing the SCG supported cell in the dual connectivity, according to an embodiment of the disclosure.

At operation 602, the mmW cell is blocked UE 200 to service. Further, at operation 604, the service which blocked the mmW is terminated. At operation 606, the UE 200 starts measuring the mmW cells if the network configures the mmW measurements. Furthermore, at operation 608, the mmW cells are added.

At operation 610, the UE 200 may measure mmW cells in mm W locations. Further, at operation 612, the mmW cells are added.

Figure 7:
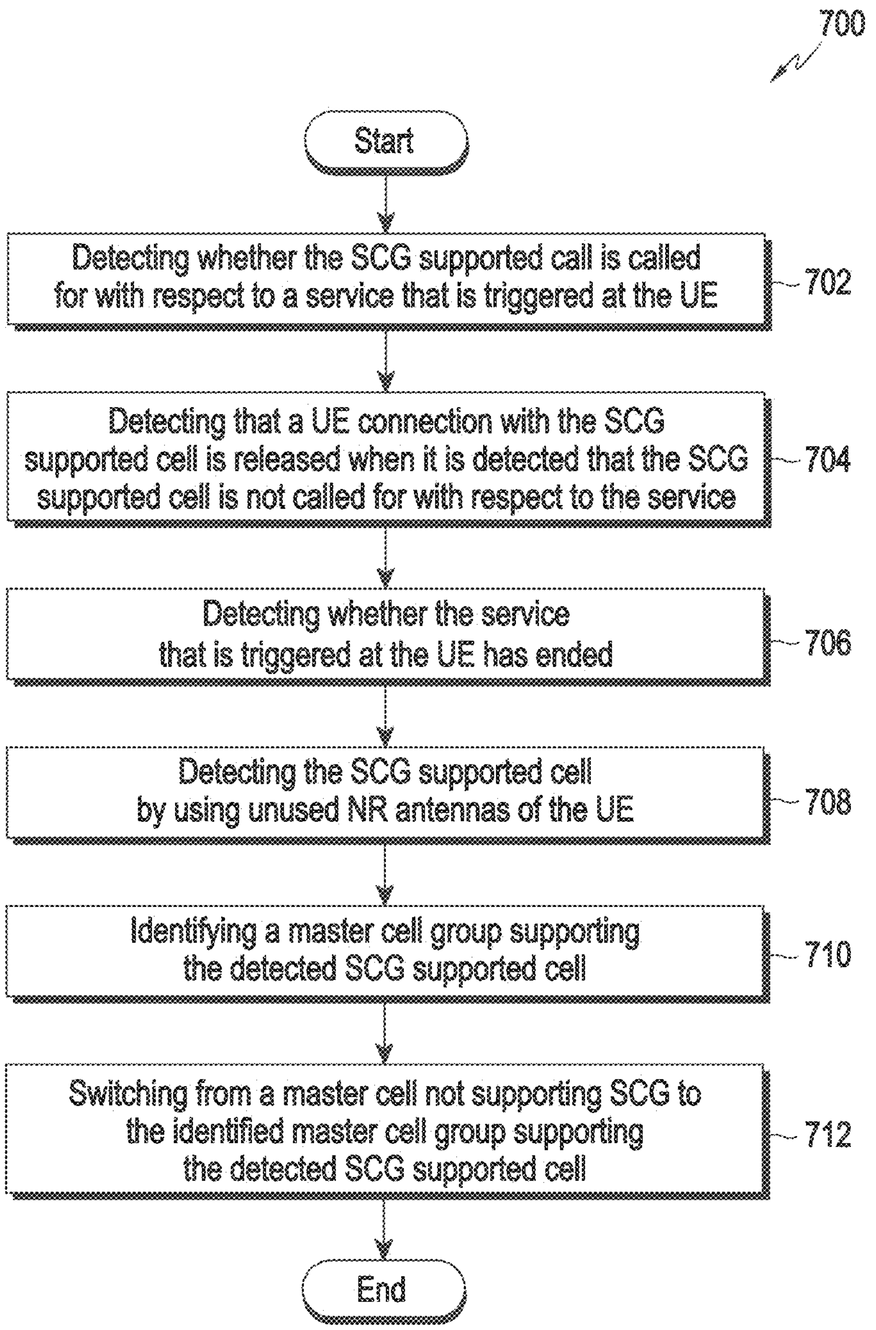
FIG. 7 illustrates a flow diagram depicting operations of a method for prioritizing the SCG supported cell in the dual connectivity, according to an embodiment of the disclosure.

FIG. 7 illustrates a flow diagram depicting operations of a method for prioritizing the SCG supported cell in the dual connectivity, according to an embodiment of the disclosure. The method 700 as shown in FIG. 7 is performed by the UE 200 for prioritizing the SCG supported cell in dual connectivity.

At operation 702, the method 700 includes detecting whether the SCG supported cell is called for with respect to a service that is triggered at the UE 200. In an embodiment of the disclosure, the SCG supported cell supports one or more operating frequencies in one of a frequency range-1 (FR-1) or a frequency range-2 (FR-2).

At operation 704, the method 700 includes detecting that the connection of the UE 200 with the SCG supported cell is released in a case in which it is detected that the SCG supported cell is not called for with respect to the service that is triggered at the UE 200. In an embodiment of the disclosure, the service for which the SCG supported cell is not called for may be VoLTE, ViLTE, VoNR, ViNR, or the like.

At operation 706, the method 700 includes detecting whether the service that is triggered at the UE 200 has ended.

At operation 708, the method 700 includes detecting, based on network configured SCG measurements, the SCG supported cell by using unused NR antennas of the UE 200, upon detecting that the service that is triggered at the UE 200 has ended. For detecting the SCG supported cell, the method 700 includes detecting whether a new service is triggered at the UE 200 upon detecting that the service that is triggered at the UE 200 has ended. Further, the method 700 includes determining whether the new service triggered at the UE 200 calls for the higher data rate upon detecting that the new service is triggered at the UE 200. The method 700 includes determining whether a network configured the SCG measurements. Furthermore, the method 700 includes detecting the SCG supported cell by using the one or more unused NR antennas of the UE 200 upon determining that the network configured the SCG measurements.

Further, the method 700 includes determining whether a current serving cell of the UE 200 is stored in a cell database. Also, the method 700 includes determining if the current serving cell corresponds to a highest priority RAT upon determining that the current serving cell of the UE 200 is stored in the cell database. The method 700 includes detecting one or more neighboring cells associated with the current serving cell upon determining that the current serving cell is not stored in the cell database or the current serving cell does not correspond to the highest priority RAT. The method 700 includes determining if measurements associated with the one or more neighboring cells are above a specified threshold by using the cell database. Furthermore, the method 700 includes detecting, from amongst the detected one or more neighboring cells, one or more SCG supported cells at a current location of the UE 200 using the one or more unused NR antennas upon determining that the measurements associated with the one or more neighboring cells are above the specified threshold.

Furthermore, the method 700 includes transmitting a measurement report associated with the one or more SCG supported cells to a network. The method 700 includes detecting if a HO message is received from the network within a specified time duration in response to the transmission of the measurement report. Further, the method 700 includes releasing the current connection of the UE 200 upon detecting that the HO message is not received from the network within the specified time duration. The method 700 also includes performing a cell reselection process to select the SCG supported cell that has better network parameters among the detected one or more SCG supported cells in comparison to other SCG supported cells among the detected one or more SCG supported cells.

At operation 710, the method 700 includes identifying a master cell group supporting the detected SCG supported cell. In an embodiment of the disclosure, each cell in the master cell group supports one of FR-1 or LTE.

At operation 712, the method 700 includes switching from a master cell not supporting SCG to the identified master cell group supporting the detected SCG supported cell.

Further, the method 700 includes storing information associated with one or more primary cells and one or more cell parameters associated with one or more SCG supported cells in a cell database, wherein the one or more cell parameters include at least one or a PCI, a frequency band, and a measurement threshold.

In an embodiment of the disclosure, the cell measurement for detecting the SCG supported cell is performed before one or more FR1/LTE measurements. Further, the method 700 includes syncing cell measurement associated with the SCG supported cell along with one or more FR1/LTE measurements during measurement gaps.

The method 700 provides for various technical advancements based on the key features discussed above. Further, the method 700 prioritizes master cells which support SCG when dual connectivity is supported by the UE 200. An aim of the method 700 is to provide better QoS to the user by using the NR antennas. The NR antennas are used to detect cells even when measurements are not configured by the network. Further, the UE 200 moves to a master cell which supports SCG cells as and when the ongoing service calls for the higher data rate. The method 700 helps the UE 200 to have the SCG cells added fast when called for and helps ensure the QoS provided to the user is high. Thus, the method 700 provides faster SCG addition, fast return to dual connectivity, better QoS to users in case of high data rate requirements for any running service at the UE, and the like. In case the UE 200 is to release the connection locally, there may be a small break in the data session. However, faster SCG addition may help to overcome the data break. Further, power consumption may be slightly higher when NR measurements are triggered (as there is no need of measuring NR cells when not configured by the network in the existing solution). This may be controlled/managed by the method 700 using the implementation specific timer. The method 700 uses unused NR antennas to detect the presence of cells at the location and if available, the UE 200 may attempt to move to the cell which supports the detected NR cells. Further, the method 700 utilizes unused NR antennas to detect the presence of cells at the location when there are no NR measurements configured by the network, and the UE 200 moves to a cell which may act as an anchor (master) cell for NR secondary cells.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a user equipment (UE), for prioritizing a secondary cell group (SCG) supported cell in dual connectivity, the method comprising:

detecting whether the SCG supported cell is called for with respect to a service that is triggered at the UE;

detecting that a UE connection with the SCG supported cell is released in a case in which it is detected that the SCG supported cell is not called for with respect to the service that is triggered at the UE;

detecting whether the service that is triggered at the UE has ended;

detecting, based on network configured SCG measurements, the SCG supported cell by using one or more unused new radio (NR) antennas of the UE, upon detecting that the service that is triggered at the UE has ended;

identifying a master cell group (MCG) supporting the detected SCG supported cell; and switching from a master cell not supporting SCG to the identified MCG supporting the detected SCG supported cell.

2. The method as claimed in claim 1, wherein the SCG supported cell supports one or more operating frequencies in one of a frequency range-1 (FR-1) or a frequency range-2 (FR-2).

3. The method as claimed in claim 1, wherein each cell in the MCG supports one of a frequency range-1 (FR-1) or long-term evolution (LTE).

4. The method as claimed in claim 1, further comprising:

storing information associated with one or more primary cells and one or more cell parameters associated with one or more SCG supported cells in a cell database, wherein the one or more cell parameters include a physical cell identifier (PCI), a frequency band, and a measurement threshold.

5. The method as claimed in claim 1, wherein, for detecting the SCG supported cell, the method further comprises:

detecting whether a new service is triggered at the UE, based on detecting that the service that is triggered at the UE has ended;

determining whether the new service that is triggered at the UE calls for a higher data rate, based on detecting that the new service is triggered at the UE;

determining whether a network configured the SCG measurements; and detecting the SCG supported cell by using the one or more unused NR antennas of the UE, based on determining that the network configured the SCG measurements.

6. The method as claimed in claim 1, wherein, for detecting the SCG supported cell, the method further comprises:

determining whether a current serving cell of the UE is stored in a cell database; and determining whether the current serving cell corresponds to a highest priority radio access technology (RAT), based on determining that the current serving cell of the UE is stored in the cell database.

7. The method as claimed in claim 6, wherein, for detecting the SCG supported cell, the method further comprises:

detecting one or more neighboring cells associated with the current serving cell, based on determining that the current serving cell is not stored in the cell database or the current serving cell does not correspond to the highest priority RAT;

determining whether measurements associated with the one or more neighboring cells are above a specified threshold by using the cell database;

detecting, from amongst the detected one or more neighboring cells, one or more SCG supported cells at a current UE location by using the one or more unused NR antennas, based on determining that the measurements associated with the one or more neighboring cells are above the specified threshold;

transmitting a measurement report associated with the one or more SCG supported cells to a network;

detecting whether a handover (HO) message is received from the network within a specified time duration in response to the transmission of the measurement report;

releasing a current UE connection, based on detecting that the HO message is not received from the network within the specified time duration; and performing a cell reselection process to select the SCG supported cell that has better network parameters among the detected one or more SCG supported cells in comparison to other SCG supported cells among the detected one or more SCG supported cells.

8. The method as claimed in claim 1, wherein the SCG measurements for detecting the SCG supported cell is performed before one or more frequency range-1 (FR1)/long-term evolution (LTE) measurements.

9. The method as claimed in claim 1, further comprising: syncing cell measurement associated with the SCG supported cell along with one or more frequency range-1 (FR1)/long-term evolution (LTE) measurements during measurement gaps.

10. The method as claimed in claim 1, wherein the service for which the SCG supported cell is not called for is one or voice over long-term evolution (VoLTE), video over long-term evolution (ViLTE), voice over new radio (VoNR), or video over new radio (ViNR).

11. A user equipment (UE) for prioritizing a secondary cell group (SCG) supported cell in dual connectivity, the UE comprising:

memory storing one or more computer programs; and one or more processors communicatively coupled to the memory, wherein the one or more computer programs include computer-executable instructions that, when executed by the one or more processors, cause the UE to:

detect whether the SCG supported cell is called for with respect to a service that is triggered at the UE, detect that a UE connection with the SCG supported cell is released in a case in which it is detected that the SCG supported cell is not called for with respect to the service that is triggered at the UE, detect whether the service that is triggered at the UE has ended, detect, based on network configured SCG measurements, the SCG supported cell by using one or more unused new radio (NR) antennas of the UE, based on detecting that the service that is triggered at the UE has ended, identify a master cell group (MCG) supporting the detected SCG supported cell, and switch from a master cell not supporting SCG to the identified MCG supporting the detected SCG supported cell.

12. The UE as claimed in claim 11, wherein the SCG supported cell supports one or more operating frequencies in one of a frequency range-1 (FR-1) or a frequency range-2 (FR-2).

13. The UE as claimed in claim 11, wherein each cell in the MCG supports one of a frequency range-1 (FR-1) or long-term evolution (LTE).

14. The UE as claimed in claim 11, wherein the one or more computer programs further include computer-executable instructions that, when executed by the one or more processors, cause the UE to:

store information associated with one or more primary cells and one or more cell parameters associated with one or more SCG supported cells in a cell database, and wherein the one or more cell parameters include a physical cell identifier (PCI), a frequency band, and a measurement threshold.

15. The UE as claimed in claim 11, wherein, for detecting the SCG supported cell, the one or more computer programs further include computer-executable instructions that, when executed by the one or more processors, cause the UE to:

detect whether a new service is triggered at the UE, based on detecting that the service that is triggered at the UE has ended, determine whether the new service that is triggered at the UE calls for a higher data rate, based on detecting that the new service is triggered at the UE, determine whether a network configured SCG measurements, and detect the SCG supported cell by using the one or more unused NR antennas or the UE, based on determining that the network configured the SCG measurements.

16. The UE as claimed in claim 11, wherein, for detecting the SCG supported cell, the one or more computer programs further include computer-executable instructions that, when executed by the one or more processors, cause the UE to:

determine whether a current serving cell of the UE is stored in a cell database, and determine whether the current serving cell corresponds to a highest priority radio access technology (RAT), based on determining that the current serving cell of the UE is stored in the cell database.

17. The UE as claimed in claim 16, wherein, for detecting the SCG supported cell, the one or more computer programs further include computer-executable instructions that, when executed by the one or more processors, cause the UE to:

detect one or more neighboring cells associated with the current serving cell, based on determining that the current serving cell is not stored in the cell database or the current serving cell does not correspond to the highest priority RAT, determine whether measurements associated with the one or more neighboring cells are above a specified threshold by using the cell database, detect, from amongst the detected one or more neighboring cells, one or more SCG supported cells at a current UE location by using the one or more unused NR antennas, based on determining that the measurements associated with the one or more neighboring cells are above the specified threshold, transmit a measurement report associated with the one or more SCG supported cells to a network, detect whether a handover (HO) message is received from the network within a specified time duration in response to the transmission of the measurement report, release a current UE connection, based on detecting that the HO message is not received from the network within the specified time duration, and perform a cell reselection process to select the SCG supported cell that has better network parameters among the detected one or more SCG supported cells in comparison to other SCG supported cells among the detected one or more SCG supported cells.

18. The UE as claimed in claim 11, wherein the SCG measurements for detecting the SCG supported cell is performed before one or more FR1/LTE measurements.

19. The UE as claimed in claim 11, wherein the one or more computer programs further include computer-executable instructions that, when executed by the one or more processors, cause the UE to:

sync cell measurement associated with the SCG supported cell along with one or more frequency range-1 (FR1)/long-term evolution (LTE) measurements during measurement gaps.

20. One or more non-transitory computer-readable storage media storing one or more computer programs including computer-executable instructions that, when executed by one or more processors of a user equipment (UE), cause the UE to perform operations, the operations comprising:

detecting whether a secondary cell group (SCG) supported cell is called for with respect to a service that is triggered at the UE;

detecting that a UE connection with the SCG supported cell is released in a case in which it is detected that the SCG supported cell is not called for with respect to the service that is triggered at the UE;

detecting whether the service that is triggered at the UE has ended;

detecting, based on network configured SCG measurements, the SCG supported cell by using one or more unused new radio (NR) antennas of the UE, based on detecting that the service that is triggered at the UE has ended;

identifying a master cell group (MCG) supporting the detected SCG supported cell; and switching from a master cell not supporting SCG to the identified MCG supporting the detected SCG supported cell.

* * * * *